March 17, 1964  L. J. LOVISEK  3,124,975
METHODS OF MAKING COMBINATION RECESS-FORMING
AND HEAD-FORMING PUNCHES
Filed Jan. 6, 1961  2 Sheets-Sheet 1

INVENTOR.
Louis J Lovisek
BY
Attys.

March 17, 1964 L. J. LOVISEK 3,124,975
METHODS OF MAKING COMBINATION RECESS-FORMING
AND HEAD-FORMING PUNCHES
Filed Jan. 6, 1961 2 Sheets-Sheet 2
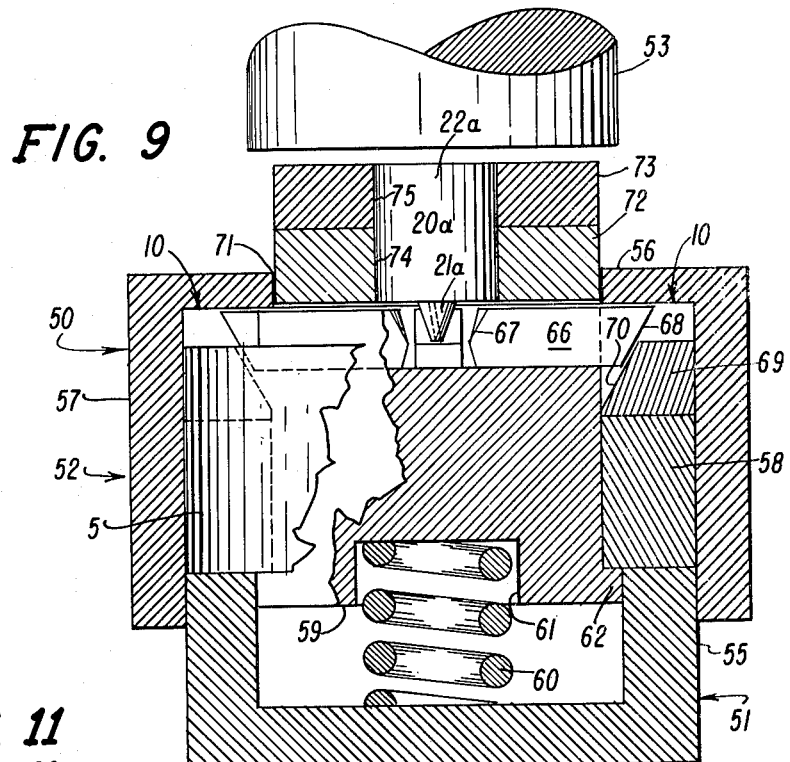
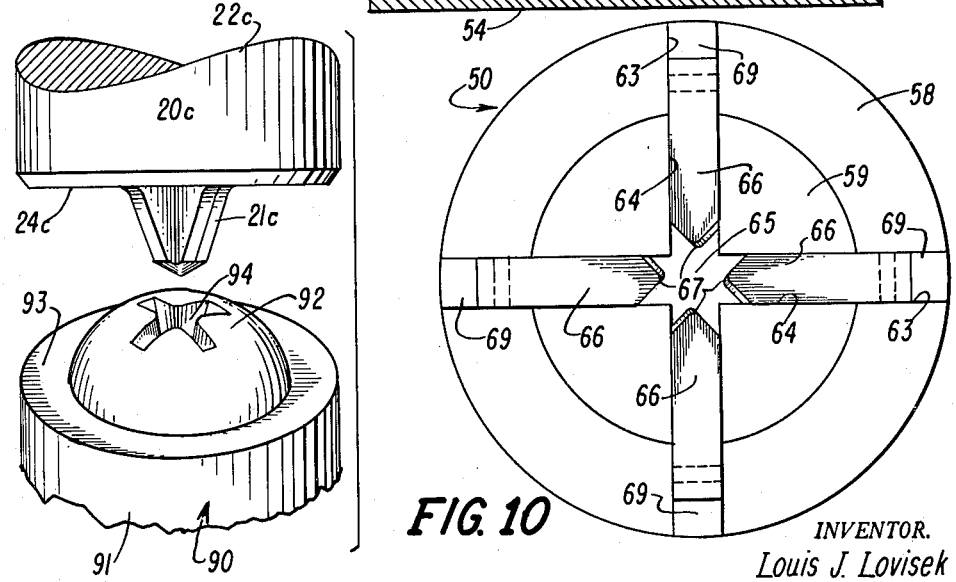
INVENTOR.
Louis J. Lovisek

United States Patent Office 3,124,975
Patented Mar. 17, 1964

3,124,975
METHODS OF MAKING COMBINATION RECESS-FORMING AND HEAD-FORMING PUNCHES
Louis J. Lovisek, Ridgewood, N.J., assignor to General American Transportation Corporation, Chicago, Ill., a corporation of New York
Filed Jan. 6, 1961, Ser. No. 81,171
6 Claims. (Cl. 76—101)

The present invention relates to methods of making recess-forming punches that are employed in forming the cruciform recesses in the heads of screws of the so-called "Phillips" type, and specifically of the type disclosed in U.S. Patent No. 2,800,829, granted on July 30, 1957 to Maxwell A. West.

In the manufacture of such screws, one end of the screw blank is subjected to a cold-heading step by the punch, so that simultaneously the screw head is shaped thereon and the cruciform recess is formed therein; and in order to affect these results, the punch comprises a front nib section and a rear body section disposed substantially in axial alignment with each other, the nib section including the required recess-forming structure, and the front end of the body section including the head-shaping structure.

More particularly, the nib section comprises a plurality of angularly spaced-apart elongated ribs or wings and a corresponding plurality of angularly spaced-apart elongated grooves or flutes, the ribs and the flutes extending generally axially along the nib section in alternate circumferential disposition thereabout and with the ribs forwardly inclined with respect to the axis thereof. Ordinarily, four of the ribs are provided in substantially equally angularly spaced-apart relation, so that the lateral cross-section of the nib section has a substantially cruciform configuration generally corresponding to that of the required cruciform recess that is to be formed in the head of the screw blank in the previously mentioned cold-heading step.

These cold-heading punches are conventionally manufactured from a punch blank by machine operations involving the utilization of milling cutters to form the required configuration of the nib section thereof, which operations are both exceedingly tedious and quite expensive to carry out.

Accordingly, it is the general object of the present invention to provide an improved method of making a recess-forming punch of the character described that may be employed in the manufacture of screw fasteners of the types mentioned, wherein the required configuration is imparted to the nib section of the provided punch blank utilizing an improved extrusion step so that simultaneously the plurality of angularly spaced-apart elongated ribs and flutes are formed on the nib section.

Another object of the invention is to provide an improved method of making a recess-forming punch of the character described, wherein the extrusion step mentioned involves the utilization of a plurality of substantially chisel-like dies disposed in angularly spaced-apart relation and mounted upon a block for guided movements substantially radially inwardly toward each other and toward the axis of the nib section in its cooperating supported position with respect to the block, and wherein the chisel-like dies are simultaneously moved in guided relation upon the block radially inwardly toward each other and toward the axis of the nib section in its cooperating position with respect to the block and into respective engagements with angularly spaced-apart portions of the surface of the nib section in order to effect the substantial extrusion of the metal of the nib section radially of the axis thereof so as simultaneously to form both the corresponding plurality of angularly spaced-apart elongated flutes in the nib section and the corresponding plurality of angularly spaced-apart elongated ribs on the nib section, and wherein the chisel-like dies are so shaped and disposed that the flutes and the ribs thus formed extend generally axially along the nib section in alternate circumferential disposition thereabout and with the ribs forwardly inclined with respect to the axis thereof.

A further object of the invention is to provide a method of the character described, wherein the chisel-like dies are also so shaped and disposed that each of the ribs mentioned is formed with a pair of substantially circumferentially spaced-apart side surfaces that are respectively arranged in substantially parallel planes.

A further object of the invention is to provide a method of the character described, wherein the chisel-like dies are so shaped and disposed that the substantially parallel planes of the side surfaces of each of the ribs are inclined at a slight angle to the axis of the nib section.

A further object of the invention is to provide a method of the character described, wherein the block mentioned is mounted for axial movement from a normal position into a work position, and wherein the punch blank is pressed axially forwardly toward the block with the nib section thereof inserted in a nib-receiving opening provided in the block and with the front face of the body section thereof in firm engagement with the outer surface of the block so as to effect axial movement of the block from its normal position into its work position, and wherein the axial movement of the block from its normal position into its work position is utilized to effect simultaneous movement of the chisel-like dies in guided relation thereupon radially inwardly toward the axis thereof and toward the axis of the nib section in its inserted position in the nib-receiving opening provided in the block, whereby the chisel-like dies are moved into respective engagements with angularly spaced-apart portions of the nib section in order to effect the substantial extrusion of the metal of the nib section radially of the axis thereof so as to form simultaneously both the corresponding plurality of angularly spaced-apart elongated flutes in the nib section and the corresponding plurality of angularly spaced-apart elongated ribs on the nib section.

A still further object of the invention is to provide an improved method of making a combination recess-forming and head-forming punch for use in the production of threaded fasteners, wherein the punch blank, after the formation of the plurality of elongated flutes in the nib section thereof, together with the formation of the corresponding plurality of elongated ribs on the nib section thereof, is subsequently subjected to pressure in a matrix die so as simultaneously to displace the nib section of the punch blank axially rearwardly into the body section thereof and to form a substantially concave recess in the front face of the body section of the punch blank surrounding the base of the nib section thereof in order to define the required head-forming structure.

Further features of the invention pertain to the particular arrangement of the steps of the method, whereby the above-outlined and additional operating features thereof are attained.

The invention, both as to its organization and method of operation, together with further objects and advantages thereof, will best be understood by reference to the following specification, taken in connection with the accompanying drawings, in which:

FIG. 9 is a reduced fragmentary side elevational view, partly broken away and partly in section, of the blank and a die block, the die block being employed in carrying out one of the steps of the method;

FIG. 10 is a reduced plan view of the upper portion of the die block mentioned, this view being taken in the direction of the arrows along the line 10—10 in FIG. 9; and FIG. 11 is a greatly enlarged fragmentary exploded view, partly in side elevation and partly in perspective, of the punch blank and a matrix die that is employed in the carrying out of one of the steps of the method.

Figure 1:
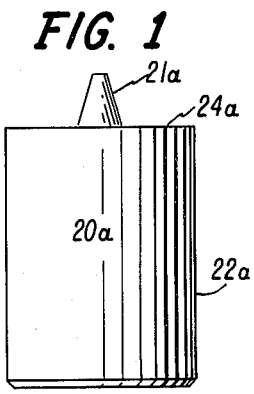
FIGURE 1 is a side elevational view of the punch blank that is employed in the method of the present invention.

In the drawings, the finished punch is designated by the reference character 20, the punch blank as initially provided is designated by the reference character 20a, and the punch blank following the successive steps of the present method and in the successive stages of development thereof between the initial condition thereof and the finished punch are respectively designated 20b, 20c, 20d and 20e.

Figure 6:
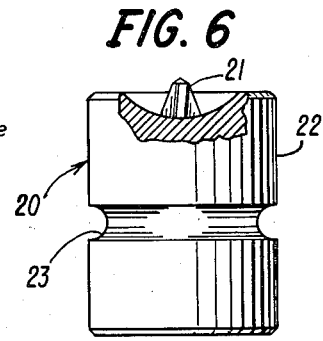
FIG. 6 is a side elevational view, partly broken away, of the finished punch.
Figure 7:
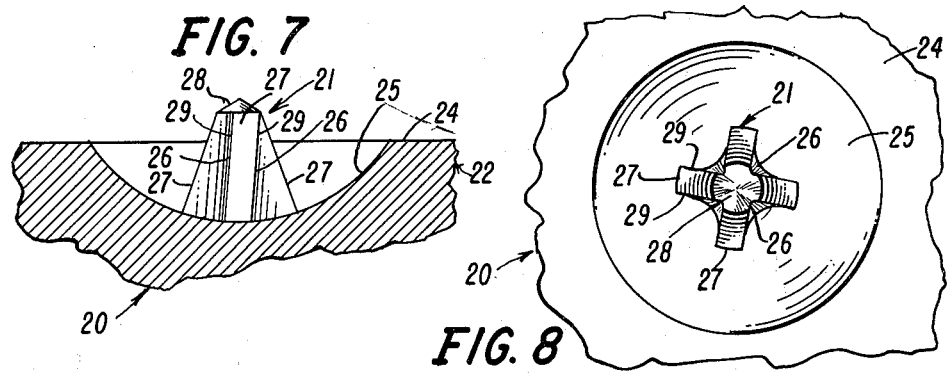
FIG. 7 is a greatly enlarged side elevational view, partly broken away, of the nib section of the finished punch of FIG. 6.
Figure 8:
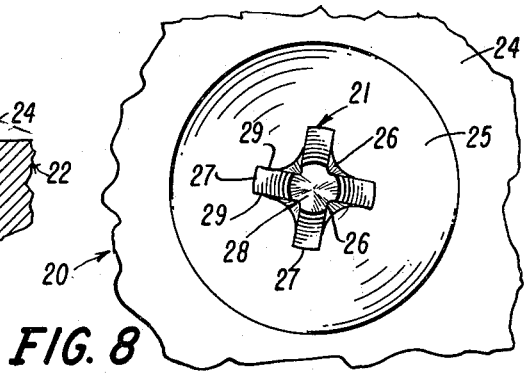
FIG. 8 is a greatly enlarged fragmentary plan view of the nib section of the finished punch of FIG. 6.

Referring now to FIGS. 6 to 8, inclusive, of the drawings, there is illustrated the finished cold-heading punch 20 that is adapted for use in a screw-heading machine in accordance with the method disclosed in the copending application of Louis J. Lovisek, Serial No. 762,765, filed September 23, 1958, now Patent No. 2,986,752, granted on June 6, 1961, in the manufacture of threaded fasteners or screws of the construction disclosed in the previously mentioned West patent. More particularly, the punch 20 is formed of a suitable steel alloy and comprises a front nib section 21 and a rear body section 22 disposed substantially in axial alignment with each other. The body section 22 is substantially cylindrical and the central portion thereof is provided with a surrounding substantially annular groove 23 therein that is employed in mounting the punch 20 in the screw-heading machine mentioned, in which it is used in the manufacture of the West screws; which arrangement accommodates rotation of the punch 20 about its longitudinal axis, without longitudinal movement thereof in the associated punch holder incorporated in the screw-heading machine mentioned.

The front end of the body section 22 terminates in a front face 24 that is disposed substantially normal to the longitudinal axis thereof and in which there is provided a substantially centrally disposed concave recess 25, the recess 25 being substantially semi-spherical in configuration and surrounding the base of the nib section 21. The nib section 21 is disposed principally within the confines of the recess 25, as clearly illustrated in FIG. 7; whereby it is only the extreme outer end of the nib section 21 that projects forwardly out of the recess 25 and forwardly of the plane of the front face 24 of the front end of the body section 22. The nib section 21 is generally frusto-conical and has a general cruciform configuration in lateral cross-section; whereby the general shape of the nib section 21 corresponds to that of the recess that is formed in the head of the West screw in carrying out the method disclosed in the previously mentioned Lovisek application and involving the screw-heading machine employed therein. More particularly, the punch 20 is especially adapted for use in the previously mentioned screw-heading machine in the manufacture of fillister head West screws; whereby the recess 25 provided in the front end of the body section 22 of the punch 20 is employed for the purpose of forming the outer surface of the head of this screw simultaneously with the forming of the recess in the head thereof; all as disclosed in the previously mentioned Lovisek application.

More particularly, the nib section 21 has, in the present example, four substantially equally angularly spaced-apart elongated grooves or flutes 26 formed therein and four substantially equally angularly spaced-apart elongated ribs or wings 27 formed thereon. The flutes 26 and the ribs 27 extend generally axially along the nib section 21 in alternate circumferential disposition thereabout and with the ribs 27 forwardly inclined with respect to the longitudinal axis thereof, as clearly illustrated in FIG. 7. The extreme outer end of the nib section 21 terminates in a substantially conical cap-like structure 28, the apex of which lies along the longitudinal center line of the nib section 21 and the body section 22. Each of the ribs 27 includes a pair of substantially circumferentially spaced-apart side surfaces 29 that are respectively arranged in substantially parallel planes that are inclined at a slight angle to the longitudinal axis of the nib section 21. This slight angle of inclination of the side surfaces 29 of each of the ribs 27 is best illustrated in FIG. 7 and corresponds to an angle of up to about 5°, and is preferably in the range of 2° to 5°. Specifically, this small angle of inclination of the side surfaces 29 of each of the ribs 27 is toward the right from the base thereof toward the outer end thereof, as viewed from the side of the rib 27, as clearly illustrated in FIG. 7. This shape of the nib section 21 insures that the cruciform recess formed thereby in the head of the West screw is provided with the four slots or arms therein, each including a driving face that is inclined at the slight angle mentioned; all as disclosed in the previously mentioned West patent.

Referring now to FIGS. 9 and 10, there is shown a composite die block or machine 50 that is employed in one of the steps of the present method of making the punch 20, as explained more fully hereinafter; which machine 50 essentially comprises lower and upper substantially cylindrical casing sections 51 and 52 that are rigidly carried by an external support, not shown, together with an hydraulically actuated ram indicated at 53. The lower casing section 51 is of substantially cup-shape, including a bottom wall 54 and an upstanding side wall 55; and the upper casing 52 is of substantially inverted cup-shape including a top wall 56 and a depending side wall 57. In the arrangement, the depending side wall 57 of the upper casing section 52 is arranged in telescoped relation with respect to the upstanding side wall 55 of the lower casing section 51; and the two casing sections 51 and 52 are suitably fixedly secured together. Also, a substantially annular ring 58 is arranged within the depending side wall 57 of the upper casing section 52 and supported in abutting relation with respect to the upper end of the upstanding side wall 55 of the lower casing section 51. A floating block 59 is arranged as a piston jointly within the upstanding side wall 55 of the lower casing section 51 and within the ring 58; and the floating block 59 is biased upwardly into an upper normal position, as shown in FIG. 9, by an arrangement including a coil spring 60 that acts in compression between the bottom wall 54 of the lower casing section 51 and the floating block 59, the upper end of the spring 60 being disposed in a substantially centrally located recess 61 provided in the bottom of the floating block 59. Also, the bore of the ring 58 is somewhat smaller than the bore of the upstanding side wall 55 of the lower casing section 51, and the lower end of the floating block 59 is provided with an annular shoulder 62 disposed within the bore of the upstanding side wall 55 of the lower casing section 51 and underhanging the lower end of the ring 58; which cooperation between the annular shoulder 62 provided on the floating block 59 and the lower end of the ring 58 provides a stop restraining the floating block 59 in its upper normal position under the bias of the compression spring 60. Also, it is pointed out that the floating block 59 is thus mounted for movement downwardly with respect to the upstanding side wall 55 of the lower casing section 51 and with respect to the ring 58 and into a lower work position, for a purpose more fully explained hereinafter.

Four substantially equally angularly spaced-apart slots 63 are formed in the top end of the ring 58, and four substantially equally angularly spaced-apart slots 64 are formed in the top end of the floating block 59, which slots 63 and 64 are respectively arranged in alignment and communicating relation with each other. Accordingly, the four slots 64 that are formed in the top end of the floating block 59 cooperate to define a substantially cruciform recess therein providing a central opening 65 in the top of the floating block 59 at the junction or crossing point of the inner ends of the slots 64. Arranged respectively in cooperating pairs of the four slots 63 and the four slots 64 are four dies 66; whereby the four dies 66 are disposed in substantially equally angularly spaced-apart relation with respect to each other and are mounted in the cooperating slot pairs 63—64 for simultaneous movements radially inwardly toward each other and toward the longitudinal axis of the floating block 59 and into the central opening 65, for a purpose more fully explained hereinafter. The front end of each of the dies 66 has a substantially chisel-like configuration or shape, as indicated at 67, that is directed toward the central opening 65; and the rear end or outer end of each of the dies 66 is provided with an inwardly tapered bearing surface 68 that projects radially outwardly into the top of the cooperating one of the slots 63 provided in the top of the ring 58. Also four bearing blocks 69 are respectively mounted in the bottoms of the four slots 63 provided in the top of the ring 58 and the inner end of each of the bearing blocks 69 is provided with an upwardly inclined bearing surface 70 that cooperates with the associated bearing surface 68 provided on the outer end of the respectively cooperating one of the dies 66.

Further, a centrally disposed opening 71 is provided in the top wall 56 of the upper casing section 52 in which there is arranged a lower collett 72 that supports an upper collett 73 disposed directly below the lower end of the ram 53; which colletts 72 and 73 are provided with internal bores respectively indicated at 74 and 75 that are adapted jointly to receive a punch blank, as indicated at 20a; which punch blank 20a has the configuration, as shown in FIG. 1, and as explained more fully hereinafter.

At this point, it is noted that the lower collett 72 is arranged in the central opening 71 provided in the top wall 56 of the upper casing section 52 and is directly supported upon the top surface of the floating block 59. Accordingly it will be appreciated that downward pressure by the ram 53 upon the stacked colletts 73 and 72 effects downward movement of the floating block 59 against the bias of the compression spring 60, with the result that the four dies 66 move downwardly with the floating block 59 and with respect to the four cooperating bearing blocks 69. More particularly, the downward movement of the four dies 66 with the floating block 59 effects cooperation between the four pairs of bearing surfaces 68 and 70 respectively carried by the four dies 66 and the four blocks 69; whereby the four blocks 69 urge the four dies 66 radially inwardly toward the longitudinal axis of the floating block 59, as the same is mounted downwardly against the bias of the compression spring 60 toward the bottom wall 54 of the lower casing section 51. Accordingly, the downward movement of the floating block 59 effects simultaneous movements of the four dies 66 radially inwardly into the central opening 65 provided in the top of the floating block 59; which simultaneous inward radial movements of the four dies 66 are utilized in one of the forming steps in the present method, as explained more fully hereinafter.

Referring now to FIG. 11, there is shown a matrix die 90 that is employed in one of the steps of the present method of making the punch 20, as explained more fully hereinafter; which matrix die 90 essentially comprises a substantially cylindrical body 91 carrying a substantially centrally disposed convex projection 92 upon the upper end thereof and surrounded by a front face 93 disposed substantially normal to the longitudinal axis of the body 91. The central portion of the convex projection 92 carried on the front end of the body 91 has a substantially cruciform recess 94 formed therein; which cruciform recess 94 has a configuration corresponding to the final shape or form of the nib section 21 of the punch 20. More particularly, the matrix die 90 is employed in a pressure step in conjunction with the punch blank 20c, as explained more fully hereinafter.

Turning now to the present method of making the finished punch 20 of the construction, as previously described in conjunction with FIGS. 6, 7 and 8, first there is provided the punch blank 20a of the construction, as shown in FIG. 1. More particularly, the punch blank 20a is formed of a suitable steel alloy and essentially comprises the front nib section 21a and the rear body section 22a disposed substantially in axial alignment with each other, the nib section 21a being substantially frustoconical providing a forwardly tapered cone surface, and the front end of the body section 22a terminating in a front face 24a disposed substantially normal to the longitudinal axis thereof and surrounding the base of the nib section 21a. The general configuration of the punch blank 20a corresponds in general outline to that of the finished punch 20, as previously described in conjunction with FIGS. 6, 7 and 8.

The punch blank 20a is placed in the composite die block or machine 50, as previously described in conjunction with FIGS. 9 and 10; and specifically, the body section 22a is arranged within the aligned bores 74 and 75 respectively provided in the colletts 72 and 73 and in such position that the nib section 21a projects into the central opening 65 provided in the top of the floating block 59, the dies 66 being disposed radially outwardly at this time, so that the front chisel-like structures 67 thereon are disposed radially outwardly with respect to the central opening 65. Also, at this time, the front face 24a of the body section 22a engages the front surface of the floating block 59; and the floating block 59 occupies its upper normal position, as illustrated in FIG. 9. The machine 50 is actuated so as to cause the ram 53 to be forced downwardly into engagement with the rear end of the body section 22a and also into engagement with the upper collett 73; whereby the blank 20a and the two colletts 72 and 73 are moved downwardly in the central opening 71 provided in the top wall 76 of the upper casing section 52 of the machine 50. As previously explained, the downward movement of the collett 73 effects downward movement of the floating block 59 against the bias of the compression spring 60, with the result that the four dies 66 are forced by the four blocks 69 radially inwardly toward the longitudinal axis of the floating block 59. More particularly, the four dies 66 move simultaneously radially inwardly in guided relation in the four slots 64 provided in the top end of the floating block 59; whereby the four chisel-like front ends 67 of the four dies 66 respectively engage four angularly spaced-apart portions of the cone surface of the nib section 21a in order to effect substantial extrusion of the metal of the nib section 21a radially outwardly of the axis thereof so as to form both the four corresponding angularly spaced-apart elongated grooves or flutes in the nib section 21a and the four corresponding angularly spaced-apart elongated ribs or wings on the nib section 21a.

More specifically, the floating block 59 is actuated from its upper normal position into its lower work position against the bias of the compression spring 60; and thereafter the ram 53 is released, so that the floating block 59 is returned by the compression spring 60 back upwardly from its lower work position into its upper normal position. At this time, the colletts 72 and 73 and the punch blank may be removed from the machine 50; whereupon the punch blank may be removed from the colletts 72 and 73.

Figure 2:
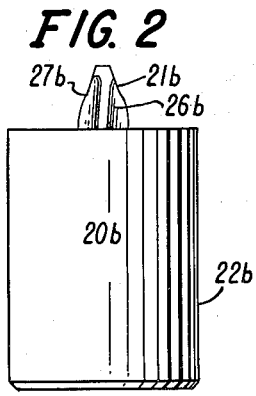
FIGS. 2 and 3 are successive side elevational views of the punch blank following the carrying out of two corresponding successive steps of the method.

After the performance of the above described extrusion step in the machine 50 of FIGS. 9 and 10, the punch blank has the configuration as shown in FIG. 2; wherein the same is designated by the reference numeral 20b. At this time, the nib section 21b has the general configuration as illustrated in FIG. 2; whereby the same comprises the four substantially equally angularly spaced-apart flutes 25b and the four substantially equally angularly spaced-apart ribs 27b arranged in alternate disposition circumferentially thereabout. In carrying out the above described extrusion step, the nib section 21b is elongated longitudinally somewhat with respect to the nib section 21a, and likewise the ribs 27b bulge radially outwardly with respect to the longitinal axis thereof; all as illustrated in FIG. 2.

It will be understood that in carrying out this extrusion step in the composite die or machine 50 of FIGS. 9 and 10, that the ribs 27b provided on the nib section 21b have substantially the configuration of the ribs 27 that are provided on the nib section 21 of the finished punch 20, as previously described in conjunction with FIGS. 6, 7 and 8. More particularly, the ribs 27b provided on the nib section 21b are provided so that the side surfaces of each of the ribs 27b are respectively arranged in substantial parallel planes that are inclined at the previously mentioned slight angle to the longitudinal axis of the nib section 21b, as previously explained in conjunction with the description of the nib section 21 of the finished punch 20.

Figure 3:
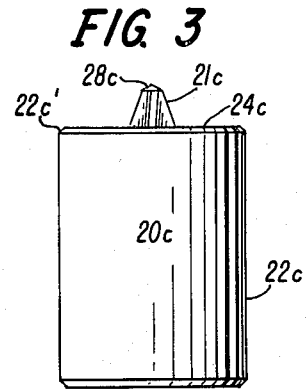

Thereafter, the punch block 20b is subjected to a number of machine steps so that it then has the general configuration as the punch block 20c of FIG. 3. In these machine operations, the nib section 21c is brought back to a substantial frusto-conical configuration and is shortened and the substantially conical cap 28c is formed on the extreme outer end thereof. Also, the upper end of the body section 22c is bevelled, as indicated at 22c', in order to eliminate the sharp corner adjacent to the front face 24c surrounding the nib section 21c.

The punch blank 20c is then transferred into cooperating relation with respect to the matrix die 90, as previously described, in conjunction with FIG. 11; and more particularly, the nib section 21c of the punch blank 20c is oriented with respect to the cruciform recess 94 provided in the central portion of the convex projection 92 carried by the front end of the matrix die 90. The matrix die 90 may comprise a portion of a hydraulically actuated press that includes a ram, not shown, that directly engages the rear end of the body section 22c of the punch blank 20c. In any case, the nib section 21c of the punch blank 20c is inserted into the cruciform recess 94, and then the punch blank 20c is moved bodily axially toward the matrix die 90; whereby the convex projection 92 carried on the front end of the hob 90 not only forces the nib section 21c axially rearwardly into the body section 22c, but it also forms a concave recess in the front face 24c of the body section 22c in surrounding relation with respect to the nib section 21c. Furthermore, the nib section 21c is extruded or finally shaped, with respect to the configuration of the ribs 27 by the cooperating surfaces defined within the cruciform recess 94 in the front end of the matrix die 90.

Figure 4:
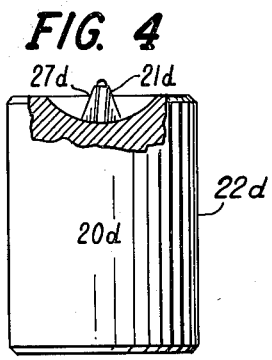
FIGS. 4 and 5 are successive side elevational views, partly broken away, of the punch blank following the carrying out of two additional corresponding successive steps of the method.

More particularly, at this time, the punch blank has the configuration as shown in FIG. 4, as designated by the reference character 20d. Specifically, in this pressure step, utilizing the matrix die 90 of FIG. 11, the ribs 27d are finally shaped on the nib section 21d; however, the nib section 21d is slightly elongated longitudinally of the axis thereof, as illustrated in FIG. 4.

Figure 5:
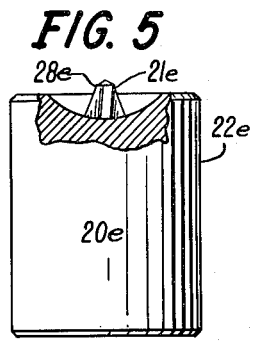

Accordingly, the punch blank 20d is subjected to further machine operations, bringing the same in the condition of FIG. 5, wherein the punch blank is designated by the reference character 20e. More particularly, the nib section 21e is brought to final configuration or shape with reference to the length thereof and with reference to the formation of the conical cap 28e on the extreme outer end thereof. Furthermore the body section 22e of the punch blank 20e is faced at the rear end thereof in order to shorten the same to the required desired finished length, as illustrated in FIG. 5.

Thereafter, the substantially annular groove is turned in the central portion of the punch blank 20e to provide the finished punch blank 20 of the configuration as illustrated in FIG. 6 and provided with the annular groove 23 therein. At this time, the punch 20 is in finished condition, as far as the configuration thereof is concerned; however, the punch 20 is then subjected to the usual heat-treatments in order to effect hardening thereof; all in a conventional manner.

Finally, the outer cylindrical surface of the body section 22 is ground in order positively to insure that the same is entirely concentric with the longitudinal axis thereof and with the longitudinal axis of the nib section 21 thereof.

Of course, the finished punch 20 is employed in the head-forming machine that is used in the method disclosed in the previously mentioned Lovisek application of manufacturing the West screws.

In view of the foregoing, it will be understood that the fundamental desired configuration of the nib section 21 of the finished punch 20 is imparted thereto in the above described extrusion step utilizing the composite die or machine 50 disclosed in FIGS. 9 and 10, while the finally desired configuration of the nib section 21 of the finished punch 20 is imparted thereto in the above described pressure step utilizing the matrix die 90 disclosed in FIG. 11. The composite method is very advantageous, since substantially the desired configuration of the nib section 21 of the finished punch 20 is imparted thereto in the extrusion step as previously described; and moreover, this extrusion step is very advantageous by virtue of the fact that the radially inward movements of the four dies 66 into the cone surface of the nib section 21a of the punch blank 20a effects desired compression of the fibers of the metal thereof, thereby effecting a substantial increase in the strength of the nib section 21 of the finished punch 20; which advantage is not obtained when milling operations are utilized in forming the punch in accordance with the conventional method.

In conclusion, it is pointed out that it has also been suggested heretofore that a punch of this general character may be made utilizing a great plurality of successive longitudinal pressure steps, but such suggested method is of little practical commercial value, by virtue of the necessity of carrying out the great number of pressure steps mentioned, as well as the provision of the great number of corresponding and correlated forming dies required therein.

In view of the foregoing, it is apparent that there has been provided an improved method of making a combination recess-forming and head-forming punch for use in the production of screws of the so-called "Phillips" type, and specifically of the "West" type; which method embodies an improved arrangement of simplified steps that may be readily carried out in an economical manner.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. The method of making a combination recess-forming and head-forming punch for use in the production of threaded fasteners, said method comprising providing a metal blank including a front nib section and a rear body section disposed substantially in axial alignment with each other, said nib section being substantially frusto-conical having a forwardly tapered cone surface, the front end of said body section terminating in a front face disposed substantially normal to the axis thereof and surrounding the base of said nib section, providing a block having an axially extending nib-receiving opening therein and an outer surface disposed substantially normal to the axis thereof and surrounding said nib-receiving opening, pressing said blank and said block axially toward each other with said nib section in inserted position in said nib-receiving opening and with said front face in firm engagement with said outer surface, providing a plurality of substantially chisel-like dies disposed in angularly spaced-apart relation and mounted upon said block for guided movements substantially radially inwardly toward the axis thereof and into said nib-receiving opening, simultaneously moving said chisel-like dies in guided relation upon said block radially inwardly toward the axis thereof and toward the axis of said nib section in its inserted position in said nib-receiving opening and into respective engagements with angularly spaced-apart portions of said cone surface in order to effect substantial extrusion of the metal of said nib section radially of the axis thereof so as to form both a corresponding plurality of angularly spaced-apart elongated flutes in said nib section and a corresponding plurality of angularly spaced-apart elongated ribs on said nib section, wherein said chisel-like dies are so shaped and disposed that said flutes and said ribs thus formed extend generally axially along said nib section in alternate circumferential disposition thereabout and with said ribs forwardly inclined with respect to the axis thereof, and then subjecting said blank to pressure so as simultaneously to displace said nib section axially rearwardly into said body section and to form a substantially concave recess in said front face surrounding the base of said nib section.

2. The method set forth in claim 1, wherein said chisel-like dies are also so shaped and disposed that each of said ribs is formed with a pair of substantially circumferentially spaced-apart side surfaces that are respectively arranged in substantially parallel planes.

3. The method set forth in claim 1, wherein said chisel-like dies are also so shaped and disposed that each of said ribs is formed with a pair of substantially circumferentially spaced-apart side surfaces that are respectively arranged in substantially parallel planes that are inclined at a slight angle to the axis of said nib section.

4. The method set forth in claim 1, wherein four of said chisel-like dies are mounted upon said block and disposed in substantially equally angularly spaced-apart relation, whereby four of said flutes are correspondingly formed in said nib section and four of said ribs are correspondingly formed on said nib section.

5. The method of making a combination recess-forming and head-forming punch for use in the production of threaded fasteners, said method comprising providing a metal blank including a front nib section and a rear body section disposed substantially in axial alignment with each other, said nib section being substantially frusto-conical having a forwardly tapered cone surface, the front end of said body section terminating in a front face disposed substantially normal to the axis thereof and surrounding the base of said nib section, providing a block having an axially extending nib-receiving opening therein and an outer surface disposed substantially normal to the axis thereof and surrounding said nib-receiving opening, mounting said block for axial movement from a normal position into a work position, pressing said blank axially forwardly toward said block with said nib section in inserted position in said nib-receiving opening and with said front face in firm engagement with said outer surface in order to effect axial movement of said block from its normal position into its work position, providing a plurality of substantially chisel-like dies disposed in angularly spaced-apart relation and mounted upon said block for guided movements substantially radially inwardly toward the axis thereof and into said nib-receiving opening, utilizing said axial movement of said block from its normal position into its work position for simultaneously moving said chisel-like dies in guided relation thereupon radially inwardly toward the axis thereof and toward the axis of said nib section in its inserted position in said nib-receving opening and into respective engagements with angularly spaced-apart portions of said cone surface in order to effect substantial extrusion of the metal of said nib section radially of the axis thereof so as to form both a corresponding plurality of angularly spaced-apart elongated flutes in said nib section and a corresponding plurality of angularly spaced-apart elongated ribs on said nib section, wherein said chisel-like dies are so shaped and disposed that said flutes and said ribs thus formed extend generally axially along said nib section in alternate circumferential disposition thereabout and with said ribs forwardly inclined with respect to the axis thereof, and then subjecting said blank to pressure so as simultaneously to displace said nib section axially rearwardly into said body section and to form a substantially concave recess in said front face surrounding the base of said rib section.

6. The method of making a combination recess-forming and head-forming punch for use in the production of threaded fasteners, said method comprising providing a metal blank including a front nib section and a rear body section disposed substantially in axial alignment with each other, said nib section being substantially frusto-conical having a forwardly tapered cone surface, the front end of said body section terminating in a front face disposed substantially normal to the axis thereof and surrounding the base of said nib section, supporting said blank with said nib section in cooperating position with respect to a block, providing a plurality of substantially chisel-like dies disposed in angularly spaced-apart relation and mounted upon said block for guided movements substantially radially inwardly toward each other and toward the axis of said nib section in its cooperating position with respect to said block, simultaneously moving said chisel-like dies in guided relation upon said block radially inwardly toward each other and toward the axis of said nib section in its cooperating position with respect to said block and into respective engagements with angularly spaced-apart portions of said cone surface in order to effect substantial extrusion of the metal of said nib section radially of the axis thereof so as to form both a corresponding plurality of angularly spaced-apart elongated flutes in said nib section and a corresponding plurality of angularly spaced-apart elongated ribs on said nib section, wherein said chisel-like dies are so shaped and disposed that said flutes and said ribs thus formed extend generally axially along said nib section in alternate circumferential disposition thereabout and with said ribs forwardly inclined with respect to the axis thereof, and then subjecting said blank to pressure so as simultaneously to displace said nib section axially rearwardly into said body section and to form a substantially concave recess in said front face surrounding the base of said nib section.

(References on following page)

References Cited in the file of this patent

UNITED STATES PATENTS

| | | | |
|---|---|---|---|
| 874,448 | Smith | Dec. 24, | 1907 |
| 1,788,463 | Kappel | Jan. 13, | 1931 |
| 2,066,372 | Tomalis | Jan. 5, | 1937 |
| 2,101,689 | Richardson | Dec. 7, | 1937 |
| 2,158,434 | Schwartz | May 16, | 1939 |
| 2,403,651 | Fluke | July 9, | 1946 |
| 2,418,338 | Dworkowski | Apr. 1, | 1947 |
| 2,656,739 | Mansfield | Oct. 27, | 1953 |
| 2,787,828 | Cousino | Apr. 9, | 1957 |
| 2,797,595 | Smith et al. | July 2, | 1957 |
| 2,912,886 | Smith | Nov. 17, | 1959 |